F. J. OBERER.
SILO.
APPLICATION FILED JAN. 8, 1914.
1,114,639.
Patented Oct. 20, 1914.
2 SHEETS—SHEET 2.
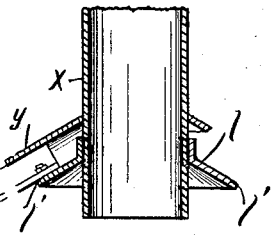
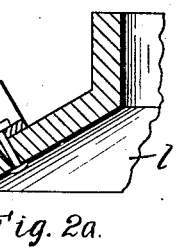
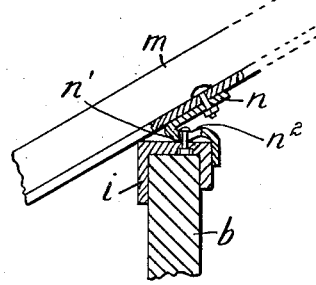
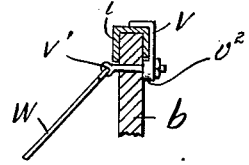
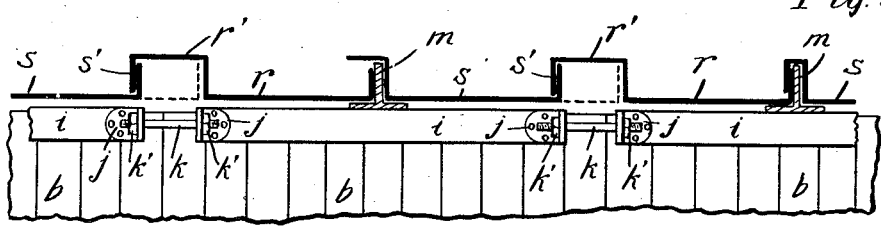
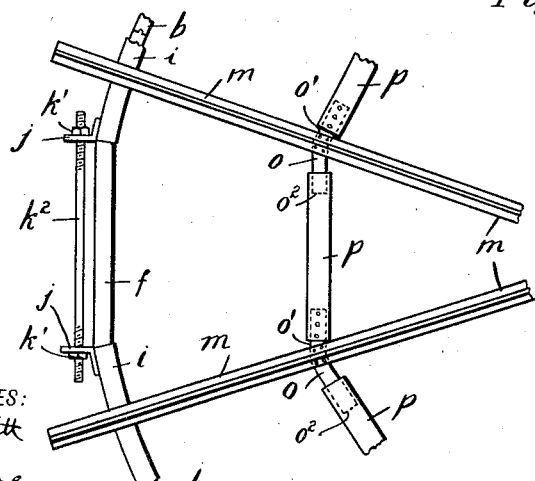
WITNESSES:
INVENTOR
F. J. Oberer.
BY
ATTORNEY

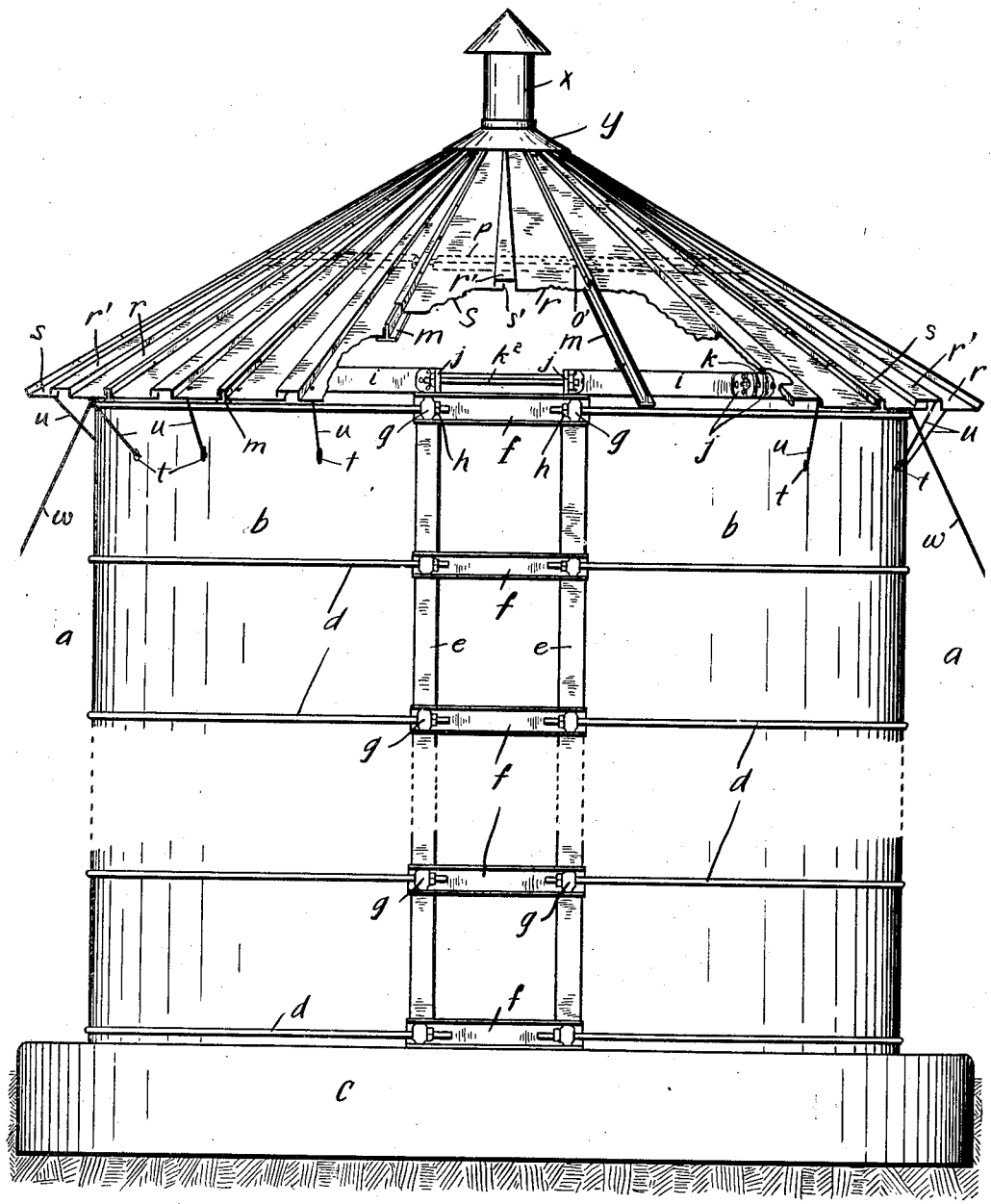

UNITED STATES PATENT OFFICE.

FREDOLIEN J. OBERER, OF PORTLAND, OREGON, ASSIGNOR OF ONE-HALF TO HENRY NORTH, OF PORTLAND, OREGON.

SILO.

1,114,639.  Specification of Letters Patent.  Patented Oct. 20, 1914.

Application filed January 8, 1914. Serial No. 811,112.

*To all whom it may concern:*

Be it known that I, FREDOLIEN J. OBERER, a citizen of the United States, and a resident of the city of Portland, county of Multnomah, State of Oregon, have invented a new and useful Improvement in Silos, of which the following is a specification.

My invention relates to ensilage and to the providing of a proper container therefor.

In order to properly house and preserve ensilage it is necessary, as well known, that the air be excluded from the mass, for the beneficial acetic and lactic acids will not be generated in those portions of the ensilage exposed to the air, and such portions will spoil.

The difficulty met with in properly housing ensilage is, that since the loose ensilage material will settle into a denser mass, if it settles in a housing not of uniform cross section, the vertical sides of the ensilage mass will relatively move from the encompassing wall portions of the container, and air spaces and the deleterious consequences mentioned will result.

In order that the sides of the container will be maintained in close contact with the sides of the ensilage mass, notwithstanding the settling of the latter, it has been customary to build the silo in cylindrical form; but in having due regard to the cost of the silo, it is built generally of wooden staves tied together by hoops or bands; and a silo so constructed has a tendency to assume a non-cylindrical shape at the top, a condition more or less caused by the pressure of the wind on one side of the silo when empty, and the expansion and contraction of the wooden staves.

Hence the object of my invention is to prevent such undesirable condition by using, in combination with a cylindrical container or silo body, an expansible and contractable roof—preferably conical—built of segmental sections having portions overlapping each other so as to permit the roof to be expanded or contracted; and to provide for such roof adjustable supporting means adapted to hold the wall portions of the silo at the top against displacement out of circular alinement, and also to restrain the movement of said wall portions to circular alinement while the top of the body is expanded or contracted.

The details of construction and operation of my invention are more readily understood from the description of the accompanying drawings, in which:

Figure 1 is an elevation of a circular stave silo showing my improved roof; a portion of the front of the roof is broken away in order to show more clearly the details of construction; Fig. 2 is a vertical radial section of the roof and a portion of the silo body; Fig. 2ª shows details of construction included in but on a larger scale than Fig. 2; Fig. 3 is a detail of construction showing an improved fastening for the guy-wires used in bracing my silo; Fig. 4 is a diagrammatic view showing the adjustable features of the roof by which it can accommodate an expansion or contraction of the top of the silo; and Fig. 5 is a plan view of the roof frame.

The silo, $a$, is of the usual construction, being formed of the tongue-and-groove staves, $b$, built on a concrete foundation, $c$, and held together by the adjustable bands $d$. The door jambs, $e$, are braced by the channel irons $f$, the latter also constituting bearings for the swivel lugs $g$, to which are secured the ends of the bands $d$. Said bands have their ends threaded and are tightened and loosened by the turning of the nuts $h$, in the usual manner.

A series of channel-iron sections or bearing caps, $i$, rest on the upper ends of the staves, $b$, and hold the latter together at the top to the form of a circle. Said channel iron sections are made with perforated lugs $j$ on their ends, and adjacent sections of these channel irons are adjustably connected by rods $k$ on the extremities of which are provided nuts $k'$. The sections over the door jambs are connected by a longer rod, $k^2$, than the rods which connect the other sections to suit the door opening. At the middle of each bearing cap section, $i$, is bolted a rocker shoe $n$, having its bottom bearing surface convexed, as shown at $n'$ in Fig. 2, so as to accommodate any variation in the angle of the rafters $m$. The shoes $n$ are bolted to their related channel iron section as shown in Figs. 2, 2ª.

An annular center-piece, $l$, having its lower edge $l'$ rounded off, as indicated in Figs. 2 and 2ª, has bolted to it the top ends of the radial rafters $m$. The latter are preferably made of T irons, but any other material, as wood or other rolled metal forms, may be used. In this way, when the circle of the silo is made smaller, the fastenings of the ends of the rafters m will accommodate any variation in the angle of inclination of the rafters m, as occurs when the roof is adjusted to the size of the circle formed by the top of the silo body.

Bolted to the under side of each rafter m is a flat supporting bar, o, having its ends o', o² curved inward in horizontal plane in such manner that the related ends of the adjacent bars will be in alinement, as shown in Fig. 5. By such related ends of adjacent supporting bars is supported a channel bar p, between adjacent rafters m, as shown in Figs. 1 and 5. Each channel bar p is bolted at one end to one of the related ends o, o' of the supporting bars o, while the other end of the channel bar p is loosely supported. In this way, when the rafters are drawn together, by the adjustment of the bands d and the rods k, the channel bars p will adjust themselves to the increase or decrease of the space between adjacent rafters. To the rafter, m, are bolted the alternating overlapping roof sections r, s. The roof section, r, is provided with an inverted box portion r', in which bears the perpendicular flange portion s' of the roof section s. The box portion r' is of such width as to allow a considerable lateral movement therein of the flange s' of the roof section s. Eyebolts, t, are provided on certain of the staves (see Figs. 1 and 2) and each roof section, r, has fastened to it a wire u, the outer end of which is secured to a related eye-bolt t. These wires, u, tend to hold the roof down on the body of the silo.

In Fig. 3 is shown a convenient fastening for the top ends of the guy-wires w. The angle clamps, v, are adapted to hook over the bearing cap sections i, and are held in place by eye-bolts v' extended through the staves b, and an eye v² of the clamp v. The guy wires, w, are fastened at the top to the eye bolts v' and are anchored at their lower ends to the ground in the usual manner (not shown). The guy wires serve, as usual, to prevent the silo from overturning. A ventilating pipe, x, provided with a collar y is adapted to extend downward through the annular center piece l being supported by the collar y, which bears on the boxes r', s' of the roof sections r, s. Each shoe n is fastened to a related bearing cap section i by a bolt n², extending through a slot in the shoe.

It will be seen that the contraction or expansion of the circle formed by the bearing caps, i, as accomplished by the adjustment of the nuts on the threaded ends of the rods k, will correspondingly laterally move the rafters circumferentially on the top of the silo body either closer together or farther apart, in so doing diminishing or increasing the diameter of the base of the conical roof; the inclination of the rafters being automatically adjusted by the construction described to correspond with such change in the diameter of the base of the conical roof. It will also be seen that when the bearing cap sections, i, and the bands, d, at the top of the silo body are loosened to accommodate the expansion of the staves, the lateral movement of the latter will be restrained to a circular alinement by said roof-supporting rafters and their connections with each other and the bearing cap sections.

The word silo is to be understood as including any type of container of similar construction to the silo body above described.

I claim:

1. In a silo of the character described, a roof consisting of segmental sections overlapping each other to permit the roof to be expanded and contracted by moving the sections together or apart; radially arranged adjustable supporting means for the roof, said supporting means being connected to the top of the walls of the silo body and holding such wall portions from displacement out of circular alinement; and said supporting means also operating to restrain the movement of said top wall portions to circular alinement while the top of the silo body is expanding or contracting.

2. In a silo of the character described, a roof consisting of segmental sections overlapping each other to permit the roof to be expanded and contracted by moving the sections together or apart; radially arranged adjustable supporting means for the roof, and connections between said supporting means and the top of the silo body, also between the individual members of the supporting means, thereby restraining the latter to similar movements in vertical planes, radiating from the vertical axis of the silo body.

3. In a silo having a body built of staves and means for binding the latter together, an expansible roof comprising a plurality of segmental sections overlapping one the other at their abutting sides; supporting means for the roof comprising radially disposed rafters fastened together at their upper ends; shoes fastened to the bottom ends of said rafters, said shoes resting on the top edge of the silo body, the shoes including means preventing the outward longitudinal movement of the rafters on the top of the silo body; adjustable connections between the rafters; and the fastenings between the rafters being adapted to permit a variation of the inclination of the rafters.

4. In a silo having a body built of staves and means for binding the latter together, band-like bearing cap sections on the upper edges of the silo body, means for adjustably fastening the ends of the bearing caps together; an expansible roof comprising a plurality of segmental sections overlapping one the other at their abutting sides; supporting means for the roof comprising radially disposed rafters fastened together at their upper ends; shoes fastened to the bottom ends of said rafters, and also fastened to their related bearing cap sections, said shoes resting on said bearing caps; the shoes including means preventing the outward longitudinal movement of the rafters on said bearing caps; adjustable connections between the rafters; and the fastenings between the rafters being adapted to permit a variation of the inclination of the rafters.

5. In a silo having a body built of staves and means for binding the latter together, an expansible roof comprising a plurality of segmental sections overlapping one the other at their abutting sides; supporting means for the roof comprising a collar; radially disposed rafters fastened together to said collar; shoes fastened to the bottom ends of said rafters, said shoes resting on the top edge of the silo body; the shoes including means preventing the outward longitudinal movement of the rafters on the top of the silo body; and adjustable connections between the rafters.

6. In a silo having a body built of staves and means for binding the latter together, an expansible conical roof comprising a plurality of segmental sections overlapping one the other at their abutting sides; supporting means for the roof comprising radially disposed rafters fastened at their upper ends in the form of a cone; shoes fastened to the bottom ends of said rafters, said shoes resting on the top edge of the silo body; the shoes including means preventing the outward longitudinal movement of the rafters on the top of the silo body; adjustable connections between the rafters; and the fastenings between the rafters being adapted to permit a variation of the inclination of the rafters.

7. In a silo having a body built of staves and means for binding the latter together, band-like bearing cap sections on the upper edges of the silo body, means for adjustably fastening the ends of the bearing caps together; an expansible roof comprising a plurality of segmental sections overlapping one the other at their abutting sides; supporting means for the roof comprising radially disposed rafters fastened together at their upper ends; shoes fastened to the bottom ends of said rafters, and also fastened to their related bearing cap section, said shoes resting on said bearing caps, the bottom bearing faces of said shoes being convexed; the shoes including means preventing the outward longitudinal movement of the rafters on said bearing caps; adjustable connections between the rafters; and the fastenings between the rafters being adapted to permit a variation of the inclination of the rafters.

FREDOLIEN J. OBERER.

Witnesses:
W. C. SCHMITT,
CECIL LONG.